United States Patent
Pellegrino

(10) Patent No.: US 8,582,267 B2
(45) Date of Patent: Nov. 12, 2013

(54) SYSTEM AND METHOD TO LIMIT IN-RUSH CURRENT

(75) Inventor: John Pellegrino, Westford, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 447 days.

(21) Appl. No.: 12/718,526

(22) Filed: Mar. 5, 2010

(65) Prior Publication Data

US 2011/0216461 A1    Sep. 8, 2011

(51) Int. Cl.
*H02H 9/08*    (2006.01)
*H02H 3/08*    (2006.01)
*H02H 9/02*    (2006.01)

(52) U.S. Cl.
USPC ........................................ 361/93.9; 361/93.1

(58) Field of Classification Search
USPC .................. 361/93.9, 56, 111, 93.1
See application file for complete search history.

(56) References Cited

U.S. PATENT DOCUMENTS

| | | |
|---|---|---|
| 4,494,064 A | 1/1985 | Harkness |
| 5,010,293 A | 4/1991 | Ellersick |
| 5,087,871 A | 2/1992 | Losel |
| 5,283,707 A | 2/1994 | Conners et al. |
| 5,374,887 A | 12/1994 | Drobnik |
| 5,519,264 A | 5/1996 | Heyden et al. |
| 5,572,395 A | 11/1996 | Rasums et al. |
| 5,920,186 A | 7/1999 | Ninh et al. |
| 5,991,175 A | 11/1999 | Liu |
| 6,163,712 A | 12/2000 | Winkler et al. |
| 6,335,654 B1 | 1/2002 | Cole |
| 6,831,447 B1 * | 12/2004 | Wittenberg .................. 323/222 |
| 7,408,755 B1 | 8/2008 | Ye et al. |
| 7,609,499 B2 | 10/2009 | Hussein et al. |
| 2002/0176216 A1 | 11/2002 | Del Signore, II et al. |
| 2006/0227478 A1 | 10/2006 | Herr et al. |
| 2007/0216383 A1 | 9/2007 | Al-Shyoukh et al. |
| 2007/0223260 A1 | 9/2007 | Wang et al. |
| 2007/0236848 A1 * | 10/2007 | Mayell ........................ 361/93.1 |
| 2008/0246456 A1 | 10/2008 | Djenguerian et al. |
| 2009/0033152 A1 | 2/2009 | Harris |
| 2009/0201619 A1 | 8/2009 | Mayell |

* cited by examiner

*Primary Examiner* — Jared Fureman
*Assistant Examiner* — Christopher Clark
(74) *Attorney, Agent, or Firm* — Sunstein Kann Murphy & Timbers LLP

(57) ABSTRACT

An in-rush current limiting system has a fast response time so that it can be used with power supplies that turn on and off rapidly. The system dissipates very little power during the normal mode of operation. This is achieved, in various embodiments, by connecting a regulator in series with a load capacitance and in parallel with the system load.

15 Claims, 3 Drawing Sheets

SYSTEM AND METHOD TO LIMIT IN-RUSH CURRENT

STATEMENT REGARDING FEDERALLY SPONSORED RESEARCH OR DEVELOPMENT

Figure 1:
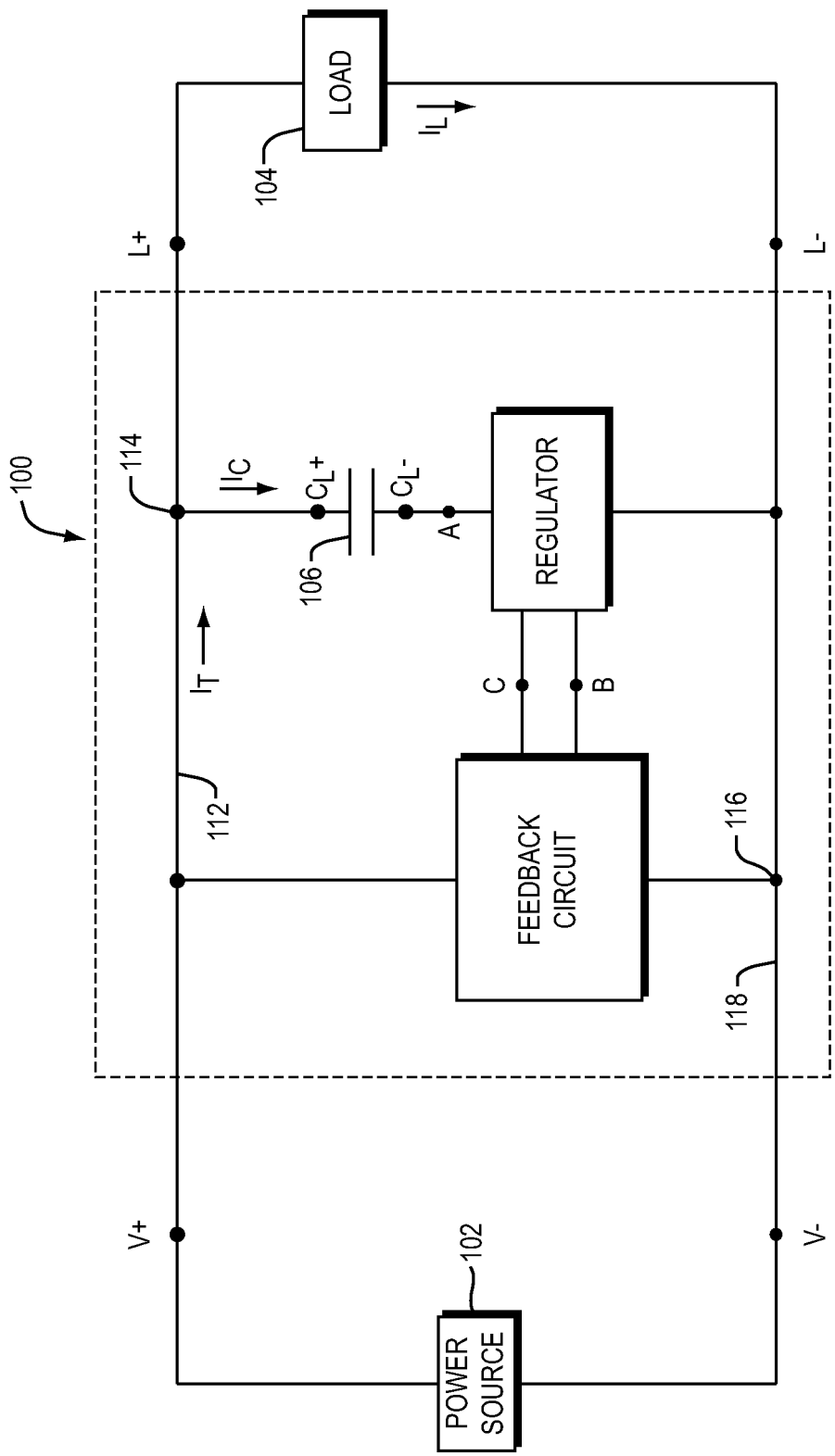

This invention was made with government support under Contract No. N00030-C-0010 awarded by the United States Navy. The government has certain rights in the invention.

FIELD OF THE INVENTION

This invention relates to in-rush current-limiting systems and methods, and in particular to systems and methods involving active devices.

BACKGROUND

In many electronic and electrical systems, a large capacitive load is connected in parallel with the system load to filter out current spikes and noise on the power-supply lines. If unfiltered, these spikes and noise can damage the system load, the power supply, or both. During power-up, a large current can flow through the capacitive load, charging the constituent capacitors. This current is commonly known as "in-rush" current and it can substantially exceed the magnitude of the peak current of the electronic or electrical system during its normal operation. Thus, a large in-rush current can damage the power source or may disrupt the operation of other devices connected to the same power bus.

The in-rush current can be limited by connecting passive elements, such as an inductor or a temperature-sensitive resistor, in series with the power source and the system load. Active elements, such as a transistor, may also be connected in series with the power source and the load to limit the in-rush current. The active element(s) may be controlled either by an external source or by a feedback circuit that senses the total current flowing from the power source.

Systems using passive elements tend to be bulky, as the passive elements used are large in size. They also respond relatively slowly to a change in the supply voltage and, hence, may be unsuitable when the supply voltage can change frequently in a short time period. In-rush current limiting systems using active components may require an additional power supply. Moreover, the active element in these systems is connected in series with the power source and the load. As a result, the load current flows through the active element during normal course of operation of the system (i.e., beyond the initial power-up period), causing the system to dissipate power during its normal operation.

SUMMARY OF THE INVENTION

A in-rush current-limiting system according to the present invention can be small and highly responsive to rapid changes in the output voltage and current, or to a power supply. The system does not need an additional power supply, and may dissipate substantially no power during the normal course of operation of the system. This can be achieved by connecting an active component in series with the capacitive load, but in parallel with the system load, and by using a feedback circuit to control the active component, where the feedback circuit responds to the load-capacitor current. As used herein, the term "substantially" generally means ±10%, and in some embodiments, ±5%.

In a first aspect, embodiments of the invention feature an in-rush current-limiting system for a circuit comprising a load and a load capacitor. A power source supplies power to the load, i.e., circuitry performing the desired operations. The in-rush current-limiting system may include a regulator adapted for parallel connection to the load and in series with the load capacitor, and a feedback circuit for controlling the regulator. In this configuration, the current charging the load capacitor also flows through the regulator. The regulator may be a transistor, i.e., an active device that can change its mode of operation in response to a control signal, such as that provided by the feedback circuit. The transistor can be a field-effect transistor or a bipolar junction transistor.

In some embodiments, the feedback circuit includes a current-sensing element for sensing current flowing through the regulator, which is also the current charging the load capacitor. The feedback circuit also includes an amplifier and a biasing circuit for generating a control signal to control the regulator. The current-sensing element may be a resistor, and the amplifier may be a transistor or an integrated circuit. The biasing circuit can be a voltage divider including first and second resistors. Alternatively, the biasing circuit may comprise current-source circuitry.

In a second aspect, embodiments of the invention feature a method for limiting in-rush current in a circuit having a load and a load capacitor. The method may include the step of sensing a current flow in a regulator, in a feedback circuit. The regulator is connected in parallel to the load and in series with the load capacitor so as to facilitate sensing the load-capacitor charging current. The method may also include the step of adjusting an impedance of the regulator in response to the current flow. If the regulator impedance is increased as the current flowing through the regulator increases, the current flow can be limited to a pre-determined maximum value.

In some embodiments, the method of limiting in-rush current includes the steps of initially setting the regulator impedance to a low value, allowing high load-capacitor charging current so that the load capacitor can be charged at high speed, and initially setting the feedback circuit to an off mode. When the feedback circuit is in the off mode, the regulator impedance remains low. Additionally, the in-rush current limiting method may include the steps of setting the feedback circuit to an on mode when the sensed current flow exceeds a pre-determined threshold, and in response, setting the regulator impedance to a high value. When the regulator impedance is high, the current flowing through the regulator, i.e., the current charging is the load capacitor, can be limited.

The method of limiting in-rush current may also include the steps of setting the feedback circuit to an off mode when the current flow sensed is less than a predetermined threshold, and in response, setting the regulator impedance to a low value. Thus, when the load capacitor is substantially fully charged, and as a result, the capacitor charging current is low, it need not be limited. This allows the load-capacitor to recharge quickly if it partially discharges due to a fluctuation in the output of the power supply.

In a third aspect, embodiments of the invention feature a method of limiting in-rush current in a circuit having a capacitive load and a system load. The method may comprise the steps of connecting an active component in series with the capacitive load, but in parallel with the system load, and controlling the active component using feedback responsive to current through the load capacitor. The active component may be controlled by changing its impedance, thereby limiting the current charging the capacitive load.

LIST OF FIGURES

The invention and various embodiments and features may be better understood by reference to the following drawings in which:

FIG. 1 schematically illustrates an embodiment of the in-rush current limiting system implemented in a representative circuit.

Figure 2:
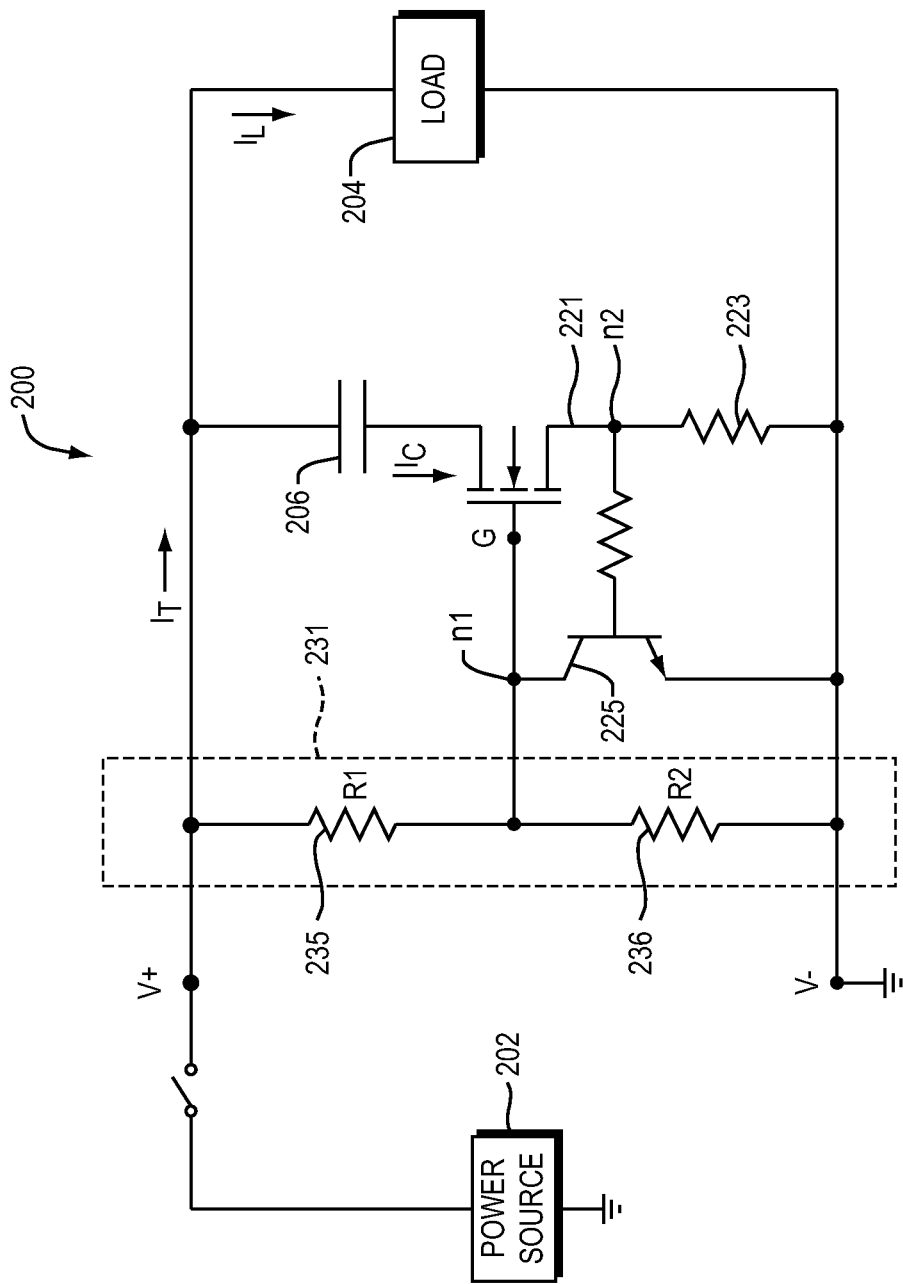
Figure 3:
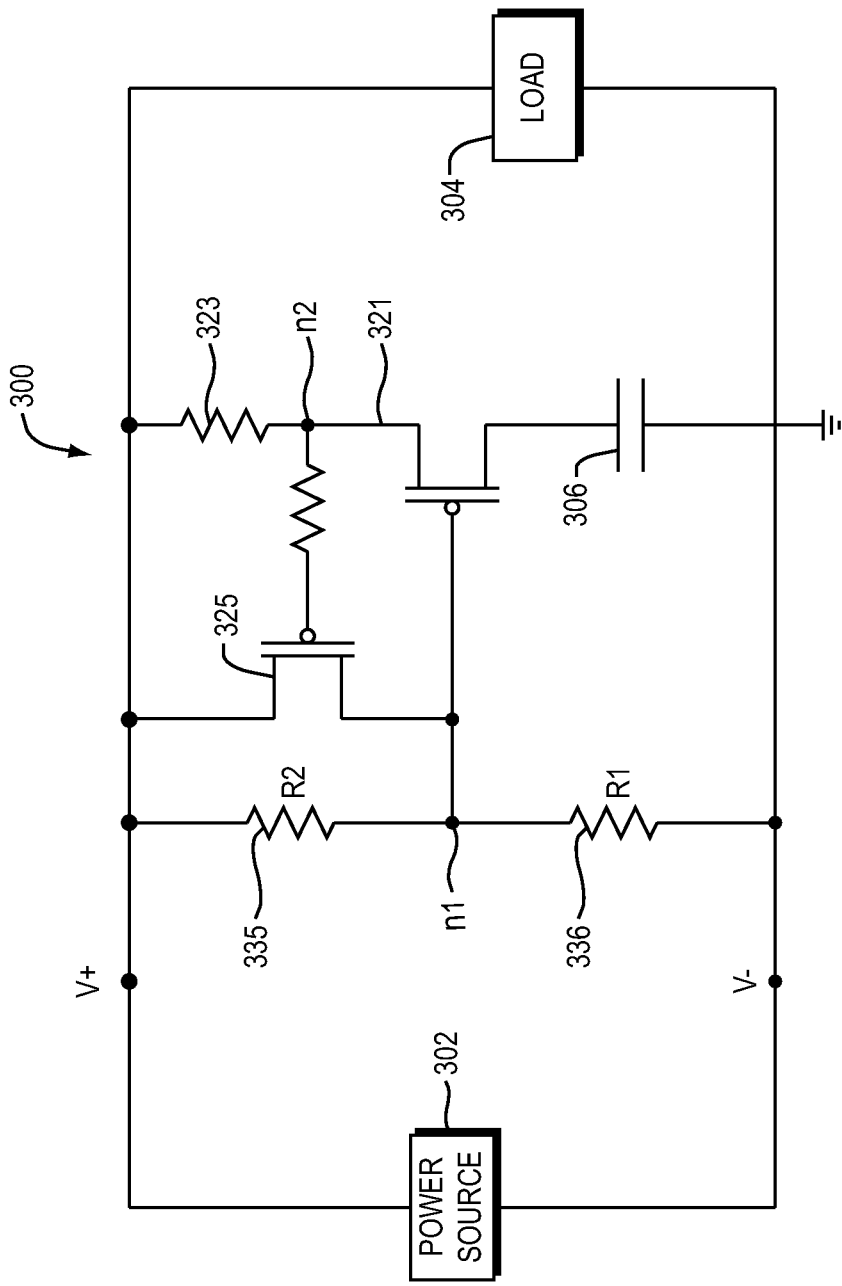

FIGS. 2 and 3 show embodiments of the in-rush current limiting system using n-type and p-type transistors, respectively.

DETAILED DESCRIPTION

In the in-rush current limiting system 100, schematically shown in FIG. 1, terminals V+ and V− of a power source 102 are connected to terminals L+ and L−, respectively, of a system load 104. Load 104 may be, for example, a device to be powered, such as a digital processor, communications circuitry, or system-control circuitry. Additionally, an external load capacitor 106 is connected in parallel with load 104. This parallel connection means that the total flow of current, $I_T$, in connector 112 is divided at node 114 into flows $I_L$ and $I_C$. The current $I_C$ flows through the external capacitor 106 and current $I_L$ flows through the load 104. Currents $I_C$ and $I_L$ merge at node 116, causing current $I_T$ to flow through connector 118. In general, $I_T$, $I_C$, and $I_L$ are governed by the relation $I_T = I_C + I_L$.

In the absence of an in-rush current limiting system, terminals $C_L+$ and $C_L-$ of load capacitor 106 are also connected to terminals V+ and V−, respectively, of power source 102. In the system shown in FIG. 1, however, terminal $C_L+$ is connected to terminal V+ and terminal $C_L-$ is connected to the terminal denoted as A of in-rush current limiting system 100. The in-rush current limiting system 100 includes a regulator 121 connected in series with load capacitor 106 and in parallel with load 104. A feedback circuit 125 is connected to regulator 121 using the terminals denoted as B and C, and the feedback circuit 125 is also connected to terminals V+ and V− of the voltage source 102. It should be understood, however, that these feedback circuit connections are illustrative only, and that feedback circuits connected to a regulator via more or fewer (e.g., as few as one) terminals are within the scope of the invention.

In operation, regulator 121 is initially set in a low-impedance mode and the feedback circuit 125 is set in the OFF mode, meaning that the circuit is inactive so virtually no current flows through it. When a voltage is applied by the power source 102 to load 104, the load capacitor 106 begins to charge. The charging current flows through load capacitor 106 and regulator 121 to the feedback circuit 125 via node B. The charging current is sensed in the feedback circuit 125 and when the current exceeds a predetermined maximum permissible value, the feedback circuit 125 is set in the ON mode. In this mode, the feedback circuit 125 applies a signal to regulator 121 via terminal C, and sets regulator 121 in a high-impedance mode. In the high-impedance mode, the current that can flow through regulator 121 is limited. Because regulator 121 is connected in series with the load capacitor 106, the current flowing through regulator 121 is also the in-rush current $I_C$ charging load capacitor 106. Therefore, the in-rush current $I_C$ is limited when regulator 121 is in the high-impedance mode.

The maximum permissible value of the charging current ($I_C^{max}$) is related to the maximum permissible total current flowing from the power supply ($I_T^{max}$) and the maximum (i.e., peak) load current ($I_L^{max}$). Specifically, these current values are governed by the expression $I_C^{max} = I_T^{max} - I_C^{max}$. $I_T^{max}$ is a property of the power supply. Typically, if the current from the power supply exceeds $I_T^{max}$, the power supply can heat up excessively or cannot maintain stable output voltage. A system designer can estimate the maximum or peak load current $I_L^{max}$, and accordingly, determine the maximum permissible value of the charging current from the expression above.

When the load capacitor 106 is substantially fully charged to the voltage level supplied by the power source 102, system 100 operates normally. During normal operation, capacitor 106 can compensate for small fluctuations in the power supplied by source 102, providing a relatively stable voltage and current to load 104. Once capacitor 106 is substantially fully charged, the current flow through the load capacitor 106 and regulator 121 reduces substantially to zero. Accordingly, very little power is dissipated in the regulator 121 during normal operation of system 100.

The feedback circuit 125 senses the reduction in the current flowing through regulator 121 and, in response, sets itself to the OFF mode. It then applies a signal to regulator 121 via terminal C, and sets regulator 121 back in the low-impedance mode. As the current flow through capacitor 106 and regulator 121 is substantially zero, the feedback circuit 125 remains in the OFF mode. In the OFF mode, only a small amount of current flows through the feedback circuit 125, and hence, it too dissipates very little power during the normal course of operation of system 100.

An embodiment of the in-rush current limiting system according to the present invention is shown in greater detail in FIG. 2. When power source 202 is turned on, the voltage at node n1 of the voltage divider 231 rises to a value determined by the expression $Vn1 = Vin/(1 + R1/R2)$, where R1 and R2 are the values of resistors 235 and 236 forming the voltage divider 231, respectively. The voltage at node n1 controls the operation of transistor 221, which serves as a regulator in this embodiment. Transistor 221 is an n-type transistor, which turns ON or operates in the saturation mode when the voltage applied to its gate terminal (e.g., terminal G of transistor 221) exceeds a certain threshold value dictated by characteristics of the transistor. The values R1 and R2 are selected such that Vn1 is substantially equal to a value (e.g. 12V) at which transistor 221 operates in the saturation mode. In this mode, the impedance of transistor 221 is very low, which allows capacitor 206 to charge at a high speed.

As the external load capacitor 206 begins to charge, current $I_C$ flowing through capacitor 206 rapidly increases. Current $I_C$ also flows through transistor 221 and a resistor 223, which serves as a current sensor. As current $I_C$ increases, the voltage drop across resistor 223 (i.e., the voltage at node n2) increases. This voltage controls the operation of transistor 225. In particular, if the voltage at node n2 is less than a threshold value dictated by the transistor characteristics, transistor 225 is in the OFF mode. In this mode, current cannot flow from node n1 to connector 218, and hence, the voltage at node Vn1 is determined only by the values of resistors 235 and 236, according to the expression shown above.

If the voltage at node n2 exceeds the threshold value (e.g. 0.65V), transistor 225 switches to the ON mode. In this mode, the impedance of transistor 225 is very low, allowing current to flow from node n1 to conductor 218. As a result, the voltage at node n1 drops to a lower value (e.g. 5V). Correspondingly, transistor 221 no longer operates in the saturation mode, and instead operates in a linear mode. In this mode, the impedance of transistor 221 is relatively high compared to its impedance in the saturation mode. Therefore, the current that can flow through transistor 221 and, as a result, through the capacitor 206 (i.e., $I_C$) is limited by the high impedance of transistor 221.

The current flowing through transistor 221 determines the voltage across resistor 223, which controls the operation of transistor 225, which, in turn, controls the operation of transistor 221. Thus, resistor 223 and transistor 225, in part, comprise the feedback circuit of the in-rush current limiting system 200. The voltage across resistor 223 (which must exceed the threshold voltage of transistor 225 for it to turn ON) is the product of the current flowing through resistor 223 and the resistance of resistor 223. Therefore, the magnitude of current flowing through resistor 223 (i.e., the charging current $I_C$) at which transistor 225 will turn ON will change according to the resistance of resistor 223. Accordingly, resistors of suitable resistances can be selected to accommodate different maximum permissible values of the charging current $I_C$.

In addition to limiting the capacitor in-rush current, the embodiment described above can offer some other advantages such as low power dissipation during normal operation, and quick response time, typically less than 0.5 microsecond. The response time is limited by the bandwidths of the regulator and feedback transistors, and bandwidth is an inherent property of a transistor. During normal operation, capacitor 206 typically remains fully charged. When capacitor 206 is substantially fully charged to the level of the voltage supplied by the power source 202, current $I_C$ diminishes substantially to zero. Accordingly, the voltage drop across resistor 223 (i.e., voltage at node n2) is substantially zero. As a result, transistor 225 turns off, and current cannot flow from node n1 to connector 218 through transistor 225. Thus, during normal operation of system 200, transistor 225 dissipates very little power.

As transistor 225 turns OFF, the voltage at node n1 rises to a level at which transistor 221 operates in the saturation mode. Although the impedance of transistor 221 is low in this mode, substantially no current flows through transistor 221 once capacitor 206 is fully charged, and hence, substantially no power is dissipated in transistor 221 during the normal course of operation of system 200. Thus, system 200 dissipates very little power in the regulator and feedback circuits during the normal course of operation.

System 200 can also respond quickly to changes in the condition of power supply 202. For example, if the power supplied by source 202 momentarily decreases, capacitor 206 can compensate for the partial loss of power. In doing so, capacitor 206 may discharge partially, and must be re-charged quickly. As noted above, during the normal of course of operation of system 200, transistor 221 remains in the saturation mode in which its impedance is low. Therefore, the total impedance of the charging path of capacitor 206 (i.e., the path including capacitor 206, transistor 221, and resistor 223) is low, which allows capacitor to charge quickly. Hence, system 200 can respond quickly to fluctuations in the power supplied by source 200.

Typically, an application system becomes operational when the external load capacitor is fully charged. Therefore it is generally desirable to be able to charge the external load capacitor quickly but without exceeding a maximum permissible in-rush current. In an application system in which the power source turns on and off frequently during a short time period, it is particularly important to be able to charge the external load capacitor quickly. Otherwise, the power source may turn off before the external load capacitor charges and the system becomes operational.

In system 200, transistor 221 can switch from one mode to another, i.e., from saturation mode to linear mode, and back to saturation mode, very quickly. A typical mode-transition time for transistor 221 can be 0.2 microsecond for a power transistor. Similarly, transistor 225, which controls the mode of operation of transistor 221, can switch between ON and OFF modes very quickly (e.g., in 0.05 microsecond for a typical small signal transistor). Because the impedance of transistor 221 is very low in the saturation mode, capacitor 206 can initially charge quickly, due to a lack of substantial additional impedance in the path of current $I_C$. As soon as $I_C$ begins to exceed the maximum permissible value, however, transistors 225 and 221 can switch modes so as to limit the in-rush capacitor current. Thus, system 200 can be used with a power source that turns on and off frequently in a short time period.

As shown in FIG. 3, it is possible to implement a current-limiting system according to the present invention using p-type transistors. A p-type transistor turns ON when the voltage applied to its gate terminal is below a certain threshold value and turns OFF when the voltage at the gate terminal exceeds the threshold value. Initially, when transistor 325 is in the OFF mode, the voltage at node n1 is given by the expression $Vn1=(Vin \times R1)/(R1+R2)$, where R1 and R2 are the values of resistors 335 and 336, respectively. R1 and R2 can be selected such that Vn1 is below a certain threshold, keeping transistor 321 in the saturation mode. In the saturation mode, the impedance of transistor 321 is low, and the external load capacitor 306 can charge rapidly. As current $I_C$ flowing through a current-sensing resistor 323, transistor 321, and capacitor 306 exceeds a maximum permissible value, the voltage drop across resistor 323 increases. Accordingly, the voltage at node n2 drops below a certain threshold and transistor 325 switches from the OFF to the ON mode.

When transistor 325 is in the ON mode, additional current can flow from terminal V+ of the power source 302 through transistor 325 to node n1 and, ultimately, through resistor 336. Due to this additional current, the voltage drop across resistor 336 increases, elevating the voltage at node n1 to a value equal to or slightly above the threshold voltage of transistor 321. Accordingly, transistor 321 operates in the linear mode. As the impedance of transistor 321 is high in the linear mode, in-rush charging current $I_C$ is limited.

When capacitor 306 substantially fully charged to the level of the supply voltage, $I_C$ diminishes substantially to zero. As a result, the voltage drop across resistor 323 decreases and the voltage at node n2 increases, turning transistor 325 OFF. Consequently, current flowing through resistor 336 decreases and the voltage at node n1 decreases, switching transistor 321 back into the saturation mode. Although the impedance of transistor 321 is low in the saturation mode, current $I_C$ is substantially zero because the capacitor 306 is fully charged, and thus, during the normal course of operation, the power dissipated in transistor 321 is substantially zero. As transistor 325 is in the OFF mode, it too dissipates very little power during the normal course of operation of system 300. Transistors 325 and 321 can switch from one mode to another quickly, and hence, system 300 may be suitable for use when the power source 302 is switched ON and OFF frequently.

Although the present invention has been described with reference to specific details, it is not intended that such details should be regarded as limitations upon the scope of the invention, except as and to the extent that they are included in the accompanying claims.

What is claimed is:

1. An in-rush current-limiting system, comprising:
a power source comprising first and second terminals;
a load connected to the first and second terminals of the power source without an active component connected in series therebetween; and
in-rush current-limiting circuitry comprising:
a load capacitor;
a regulator connected in series with the load capacitor, a series combination of the regulator and the load capacitor being connected in parallel to the load; and
a feedback circuit for sensing a current flowing through the load capacitor while the regulator is ON and for controlling the regulator while the regulator is maintained ON based on, at least in part, the sensed current.

2. The in-rush current limiting system of claim 1, wherein the regulator is a transistor.

3. The in-rush current limiting system of claim 2, wherein the transistor is a field-effect transistor.

4. The in-rush current limiting system of claim 2, wherein the transistor is a bipolar junction transistor.

5. The in-rush current limiting system of claim 1, wherein the feedback circuit comprises
   a current-sensing element;
   an amplifier; and
   a biasing circuit.

6. The in-rush current limiting system of claim 5, wherein the current-sensing element is a resistor.

7. The in-rush current limiting system of claim 5, wherein the amplifier is a transistor.

8. The in-rush current limiting system of claim 5, wherein the amplifier is an integrated circuit.

9. The in-rush current limiting system of claim 5, wherein the biasing circuit comprises first and second resistors.

10. The in-rush current limiting system of claim 5, wherein the biasing circuit comprises current-source circuitry.

11. A method of limiting in-rush current in a circuit having a load, a load capacitor, and a power source comprising first and second terminals, the method comprising the steps of:
   supplying, from the power source, source current comprising in-rush capacitor current and load current, the load current being supplied to the load, the load connected to the first and second terminals of the power source without an active component connected in series therebetween;
   sensing, in a feedback circuit and while a regulator is ON, the in-rush capacitor current flow in the regulator, the regulator connected in series with the load capacitor, a series combination of the regulator and the load capacitor being connected in parallel to the load; and
   in response to the sensed in-rush capacitor current flow, adjusting an impedance of the regulator while the regulator is maintained ON.

12. The method of claim 11, further comprising the steps of:
   initially setting the regulator impedance to a low value; and
   initially setting the feedback circuit to an off mode.

13. The method of claim 11, further comprising the steps of:
   setting the feedback circuit to an on mode when the sensed in-rush capacitor current flow exceeds a predetermined threshold; and
   in response, setting the regulator impedance to a high value.

14. The method of claim 11, further comprising the steps of:
   setting the feedback circuit to an off mode when the sensed in-rush capacitor current flow is less than a predetermined threshold; and
   in response, setting the regulator impedance to a low value.

15. A method of limiting in-rush current in a circuit having an in-rush capacitor and a system load, the method comprising the steps of:
   connecting first and second terminals of a power source to the system load without connecting an active component in series therebetween;
   connecting a regulator in series with the in-rush capacitor;
   connecting a series combination of the regulator and the in-rush capacitor in parallel with the system load; and
   controlling the regulator while maintaining the regulator ON using feedback responsive to current flowing through the in-rush capacitor and sensed while the regulator is ON.

* * * * *